US006688781B2

(12) United States Patent
Anderson et al.

(10) Patent No.: US 6,688,781 B2
(45) Date of Patent: Feb. 10, 2004

(54) OPTICAL CONNECTOR ADAPTER HAVING SWITCHING CAPABILITY

(75) Inventors: Jerry Max Anderson, Austell, GA (US); James C. Bandy, Duluth, GA (US); Gregory Alen Sandels, Buford, GA (US); Daniel Lee Stephenson, Lilburn, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/094,928

(22) Filed: Mar. 11, 2002

(65) Prior Publication Data

US 2003/0169975 A1 Sep. 11, 2003

(51) Int. Cl.[7] .................................................. G02B 6/36
(52) U.S. Cl. .......................................... 385/76; 385/78
(58) Field of Search .............................. 385/76, 72, 78; 439/352, 353

(56) References Cited

U.S. PATENT DOCUMENTS

| 4,872,736 | A |   | 10/1989 | Myers |   |
|---|---|---|---|---|---|
| 5,041,018 | A |   | 8/1991 | Arnett |   |
| 5,212,752 | A |   | 5/1993 | Stephenson et al. |   |
| 5,274,729 | A |   | 12/1993 | King et al. |   |
| 5,481,634 | A |   | 1/1996 | Anderson et al. |   |
| 5,647,043 | A |   | 7/1997 | Anderson et al. |   |
| 5,687,268 | A | * | 11/1997 | Stephenson et al. | .......... 385/73 |
| 5,719,977 | A |   | 2/1998 | Lampert et al. |   |
| 6,220,763 | B1 |   | 4/2001 | Stephenson |   |
| 6,511,231 | B2 |   | 1/2003 | Lampert et al. |   |
| 2002/0081076 | A1 | * | 6/2002 | Lampert et al. | .............. 385/70 |
| 2002/0111060 | A1 | * | 8/2002 | Challis et al. | .............. 439/352 |

OTHER PUBLICATIONS

U.S. patent application Ser. No. 09/748,906, Lampert et al., filed Dec. 27, 2000.

* cited by examiner

Primary Examiner—Hae Moon Hyeon
(74) Attorney, Agent, or Firm—Thomas, Kayden, Horstemeyer & Risley, LLP (57) ABSTRACT

An adapter for an optical fiber connector has a switch mounted therein and an actuation lever contained therein for actuating the switch to turn optical power on. The lever has an enlarged rear portion separated from a front portion by a flexible web. The adapter has an opening therein for receiving a connector plug which is masked by the enlarged portion of the lever when in the operative position. When a plug is to be inserted, the enlarged portion is bent up to unmask the opening. After the plug is inserted, the rear portion is aligned with the front portion of the lever and the lever slid forward to actuate the switch. In the forward position, the enlarged portion prevents access to the latching arm of the connector plug so that it cannot be removed while the power is on. The lever must be slid to the rear, turning off the power, before the connector can be removed. Latches maintain the lever in its forward, or Power On position, which can be overcome to permit sliding the lever to the rear, or Power Off position, before access to the connector plug latching arm can be had.

15 Claims, 6 Drawing Sheets

OPTICAL CONNECTOR ADAPTER HAVING SWITCHING CAPABILITY

FIELD OF THE INVENTION

This invention relates to optical connector adapters for use in optical fiber transmission and, more particularly, to an adapter for creating an electrical indication of the condition of the connector and for locking the connection during signal transmission.

BACKGROUND OF THE INVENTION

Optical fiber transmission systems are becoming widely used in the transmission of signals such as data, voice, and the like, and in many instances, are replacing traditional electrical systems. Many of the arrangements common to electrical systems, such as coupling, interconnection, splicing, and the like have their counterparts in optical systems but, because of the totally different characteristics of the transmission media, i.e., optical fiber versus metallic wire, connectorization, splicing, and the like involve quite a different apparatus. Where, for example, it is necessary to make a great number of connections in one location, both systems may use what is referred to in the art as patch panels, which provide arrays of connector adapters for interconnection, but the interconnections themselves are generally quite different.

It is common practice in the optical connector art to terminate a length of optical fiber with a connector, an example of which is the SC type connector that is shown and described in U.S. Pat. No. 5,212,752 of Stephenson et al. There are numerous types of such fiber terminating connectors, and, inasmuch as there has been little effort directed to standardization, each type of connector generally requires a different coupling arrangement to permit interconnection of two fibers, for example.

When large numbers of such interconnections are to be made, it is common practice to use patch panels for holding an array of a large number of coupler adapters. Thus, there literally can be hundreds of such adapters, all in close proximity to each other, mounted in the panel. As long as only a single type of connector, such as the SC connector, is involved, simple adapters may be used for plugging in the connectors from each side of the patch panel. In view of the fact that there are several different types of connectors in widespread use today, it has become common practice to replace the simple adapters with buildout blocks or buildout coupling adapters. In U.S. Pat. No. 5,274,729 of King et al., there is shown a buildout coupling adapter system in a patch panel that makes possible interconnections among the several different types of connectors in any combination thereof. As can be seen in that patent, a buildout block at one side (or end) thereof is configured the same as a simple coupler adapter having a keyway for receiving, for example, an SC connector. The other end of the buildout block is formed to receive a buildout which may be configured to receive and hold, for example, an SC, an ST, an LC, or an FCMV connector. Thus, the patch panel may be, on the one side thereof, pre-connectorized with optical fibers all of which are terminated by, for example, SC connectors, and the other side of the panel is ready to receive pre-connectorized fibers terminated by any one of the numerous connectors. Such an arrangement is more versatile and adaptable than those arrangements which are limited to a single type of pre-connectorized fiber. Such an arrangement also functions well in those installations where one side of the panel is not readily accessible. Thus, before being mounted in position, the panel can be pre-connectorized on the side which will be relatively inaccessible, after which it can be mounted in place, ready to receive the numerous connections thereto, regardless of connector type. In order to pre-connectorize the panel, the adapters are usually made of two parts, a base member (buildout block) that attaches to the panel and a cap member (buildout) which receives the connector plug, and which is insertable into the base member. Such a two part adapter is commonly referred to as a split adapter. One particular advantage of a split adapter, in addition to the build-out feature, is that access to the ferrule distal or butting ends for cleaning (or repair) obtains when the cap and base are separated.

In any such arrangement there is a potential safety hazard that is often present. Where one or more of the pre-connectorized fibers is carrying optical energy, such energy can be emitted from the end of the fiber connector and pass through the unoccupied buildout block or coupling adapter to the side of the panel where connections are to be made. This optical energy can be harmful for the operator or installer and can be especially harmful to his or her eyes. This hazard is most prevalent when an active connection has to be repaired, cleaned or otherwise altered by removal of an existing connectorized fiber and replacement with another. In such an instance, it might be difficult or otherwise impractical to shut off the signal transmission in that particular fiber circuit, hence, the installer is forced to deal with a light emitting junction or connection.

This hazard has long been recognized and there are numerous arrangements in the prior art for blocking any light emanating from a fiber connection through an open adapter. In U.S. Pat. No. 5,678,268 of Stephenson et al., there is shown a pivotable optical shutter arrangement wherein a normally closed pivotable shutter blocks the open exit of an adapter when a connector plug is removed. The shutter advantageously requires only one motion to open it to permit insertion of a plug or connector into the adapter. Such a shutter as shown in the patent is operable by only one hand instead of prior art arrangements which generally require awkward use of two hands by the installer. One of the disadvantages of any shutter arrangement however, is that they are easily "defeatable" in that they can be, during installation of large numbers of connectors and in the interest of expedition, for example, temporarily fixed in the open position, thus contravening their purpose. In addition, the fiber optical transmission art has progressed to the use of higher and higher light energy or power, and has reached a point where shutter arrangements in general have, because of the large light energy, become transparent to much of the energy in the form of infra-red light, which is commonly used. Additionally, when the light intensity is very high, actual damage to the optical connector and the associated fibers can occur.

There are many arrangements in the prior art aimed primarily at reducing the possibility of injuring the operator, such as are shown in U.S. patent application Ser. No. 09/748,906, filed Dec. 27, 2000 of Norman R. Lampert et al. and Ser. No. 09/784,574, filed Feb. 15, 2001 of Norman. R. Lampert et al. In the Lampert et al. arrangement, insertion of the connector plug into the adapter creates a signal, such as by activating a switch, which generates an indication that the connection is completed and signals may be transmitted through the connection. Withdrawal of the connector plug from the adapter deactivates the switch or other signal generator, indicating that the adapter is not to be used in transmitting optical signals.

With the increasing use of high power signal transmission, it is important that the butting ends of the connector ferrules within the adapter not be separated while high power light is being transmitted therethrough. Such a separation can, in the high power use, cause severe damage to the distal (or butting) ends of the ferrules. This is especially important with split adapters in a build out arrangement, inasmuch as different types of connector plugs may be used, hence generation of a signal for signaling that the signal transmission should be turned off or on should not depend upon especially designed or otherwise modified plugs. Thus any safety arrangement should, preferably, be contained within the split adapter. Further in the interests of safety, it is preferable that an operator or installer should have to take positive action to prepare the connection for signal transmission, or to disconnect the connection. In the prior art, such as in the aforementioned Lampert et al. arrangements, the operation does not require the operator or installer to take any positive action other than inserting the connector plug into the adapter or withdrawing it therefrom. It is, therefore, desirable that the operator be able to cut off the transmission through the connector prior to separation of the butting ends of the connector plug ferrules, and to delay optical transmission until the plug is fully inserted in the adapter.

SUMMARY OF THE INVENTION

The invention as disclosed herein is directed primarily to its application in a split adapter. However, the principles of the invention are readily adaptable for use in a unitary adapter.

The present invention, in a first embodiment thereof, is a split adapter comprising a base member for mounting to a panel, for example, and a cap member insertable therein. The cap member has first and second side latching members and a top latching arm which mate with corresponding latch receivers in the base to lock the cap in place in the base. The cap maybe removed from the base by depressing the latching arm and exerting a pulling force (such as one-half to one pound) on the cap to disengage the side latches. The side latches have enlarged portions at this distal ends, which are angled, as will be disclosed hereinafter, to function as latches but which are defeatable by the pulling force. As will be more clearly apparent hereinafter, when a connector plug is inserted into the cap, it serves to hold the side latches in place so that the cap is firmly attached to the base and separation effectively prevented.

In accordance with the invention, the base member has a switch mounted therein and the cap member has a switch actuation lever slidably mounted therein. Many forms of actuation lever can be substituted, such as a rotatable or pivoted actuation lever. The lever has a flexible portion which permits it to be moved out of the way for insertion of the connector plug into the cap. After the plug is inserted, the lever is slid forward by the installer or operator to where it actuates the switch, which is preferably of the plunger type, and, at the same time latches into place in the forward position. In this position, a projection on the lever bears against the underside of the top latching arm, preventing its being depressed, thereby further insuring that the cap and base are firmly locked together. The lever has an enlarged end portion which overlies and masks the latching arms of the connector plug, thereby preventing removal of the plug when the lever is in the forward position. Furthermore, in the forward or switch actuating position of the lever, the enlarged end, which masks the latching arm of the connector plug, cannot be bent out of the way, thereby insuring that the connector plug cannot be disconnected. The net result is that the cap is affixed to the base and the plug is affixed to the cap, thereby insuring against accidental or unintentional separation of the components. The actuated switch can close an electrical circuit which, for example, may directly halt signal transmission through the connector, or which may generate a signal informing an operator or monitor to halt the signal transmission. It is, of course, preferable that the circuit cut off transmission, such as by turning of the power laser, without human intervention.

When a disconnect is desired, the actuation lever must be pulled back to provide access to the plug latching arm, thereby halting the signal transmission by opening the switch. It is only after this first step that the enlarged end portion may be bent out of its masking position to give the operator or installer access to the connector plug for removal thereof.

It can be seen, and further will be more readily apparent, that when a connector plug is not in the cap, there is no signal transmission. Further, in order for signal transmission to commence, the operator must first insert the connector plug and then slide the actuation lever forward to its latched position wherein the switch is actuated to permit signal transmission and the connection cannot be broken, as by separation of the parts, thereby insuring protection of the ferrules and of any personnel in the vicinity.

In a second embodiment of the invention, the top latching arm on the cap may be eliminated in the interest of creating a smaller footprint, and the side latches relied upon to hold the cap and base together.

While the principles of the invention are shown and described as embodied in a split adapter comprising a base and a cap, the adapter may be a unitary housing in which the operative feature and components of the invention are included.

These and other features of the present invention will be more readily apparent from the following detailed description, read in conjunction with the following drawings.

DESCRIPTION OF THE DRAWINGS

FIG. 2b is a rear isometric view of the base member of FIG. 2a;

FIG. 3b is a front isometric view of the cap of FIG. 3a;

FIG. 4b is a rear isometric view of the actuation lever of FIG. 4a;

DETAILED DESCRIPTION

Figure 1:
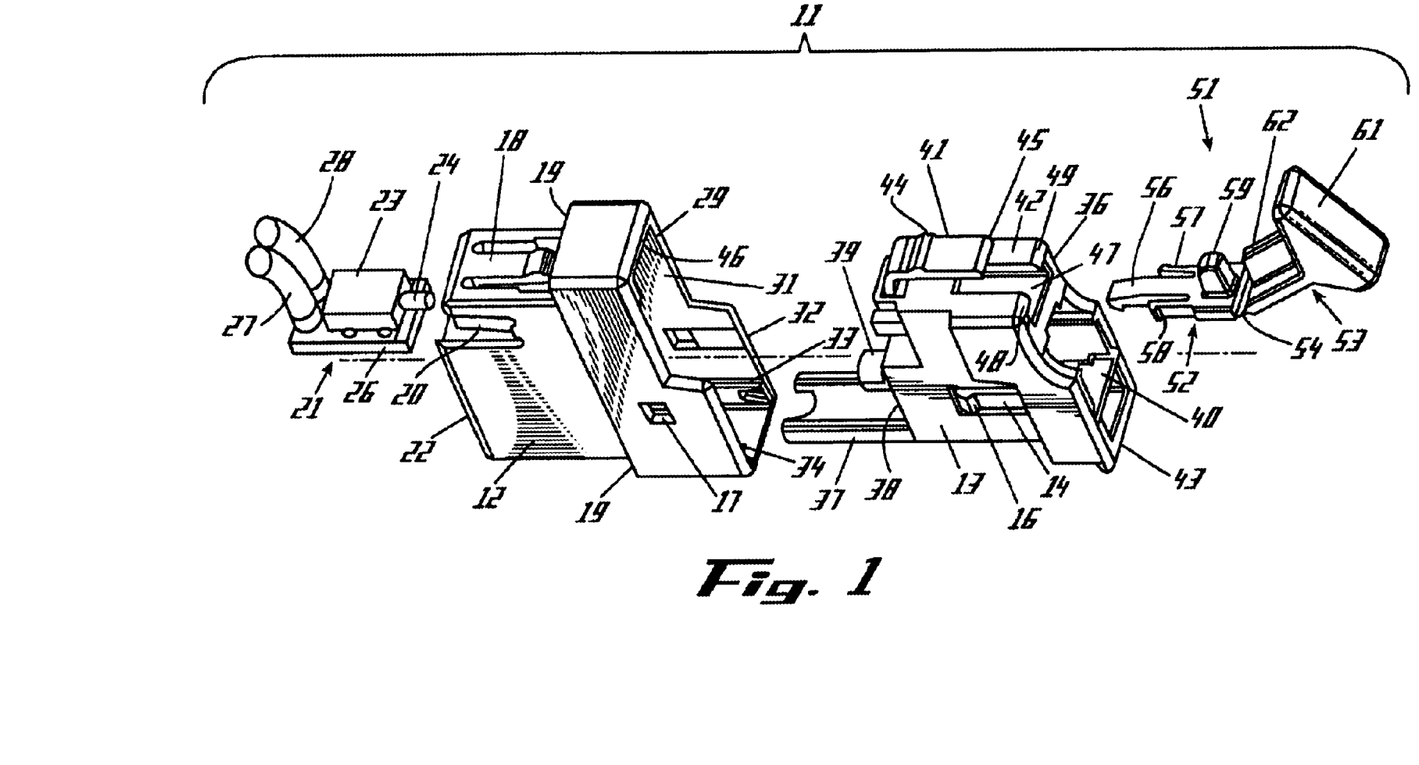
FIG. 1 is an exploded isometric view of the adapter of the invention.

FIG. 1 is an exploded isometric view of the split adapter assembly 11 of the present invention. Assembly 11 comprises a base member 12 and a cap member 13 which is adapted to be affixed to the base member 12 by means of resilient latching arms 14 (only one of which is shown), the enlarged ends 16 of which engage latching ports 17 in base 12. Base member 12 is adapted to be affixed to a panel (not shown) for example, by means of latching arms 18 and shoulders 19. As is common prior art practice, base 12 and cap 13 are made of suitable plastic material.

A switch assembly 21 is mounted by suitable means in the rear end 22 of base 12 and held in place by latching arms 20 on base 12. Assembly 21 comprises, preferably, a plunger type switch 23 having an actuating plunger 24, which is mounted on a support member 26. A pair of leads 27 and 28 extend from the assembly 21 for transmitting a signal (open/close) from the switch 23 to control circuitry, not shown, for activating a light source or signal (switch closed) or de-activating it (switch open). The terms front, rear, top, bottom, and sides are used to designate elements as shown in the drawings and are not meant to be restrictive as to orientation of the elements in use. Base 12 further comprises a substantially hollow housing 29 having an opening 31 in the front end 32 thereof for receiving cap member 13. To this end, a pair of rails 33, 34 extend from the front end 32 into the interior of housing 29 for supporting and aligning cap member 13.

Cap member 13 comprises a substantially hollow housing or body member 36 having a sled member 37 extending from the front end 38 thereof which is adapted to ride upon the rails 33 and 34 in base 12 for supporting the cap 13. A connector ferrule alignment sleeve 39 also extends from front end 38, for containing the ferrule of a connector plug (not shown) which is introduced into cap 13 through an opening 40. A latching member or arm 41 projects from the top 42 of cap 13 and extends toward the rear 43 thereof, to a distal end 45. Arm 41 has a latching lug 44 at its front end which is adapted to mate with a shoulder 46 at the top of opening 31 in base 12. This latching arrangement is more clearly shown in subsequent figures.

Extending from the rear of cap 12, at the top thereof, toward the front 38 is a slot 47 having overhangs 48 and 49 at the top thereof for receiving an actuation lever 51 which is longitudinally slideable in the slot 47 and prevented from moving vertically by overhangs 48 and 49. Lever 51 has a front portion 52 and a rear portion 53, separated by a flexible web 54. Extending from the front portion 52 is a latching arm 56 and first and second side latching arms 57 and 58. The functions of these latching arms 56, 57, and 58 will be explained and discussed hereinafter. Extending upward from the top surface of portion 52 is a projection or post 59 which will likewise be discussed hereinafter. The rear portion 53 of lever 51 has an enlarged portion 61 at its end which has a stiffening rib 62 extending therefrom, as shown, and which is shaped in a manner to be discussed hereinafter.

Figure 2A:
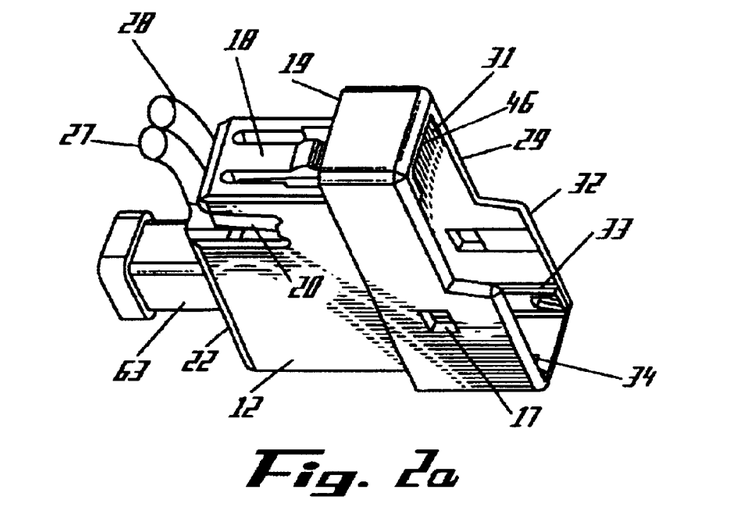
FIG. 2a is a front isometric view of the base member of the adapter.
Figure 2B:
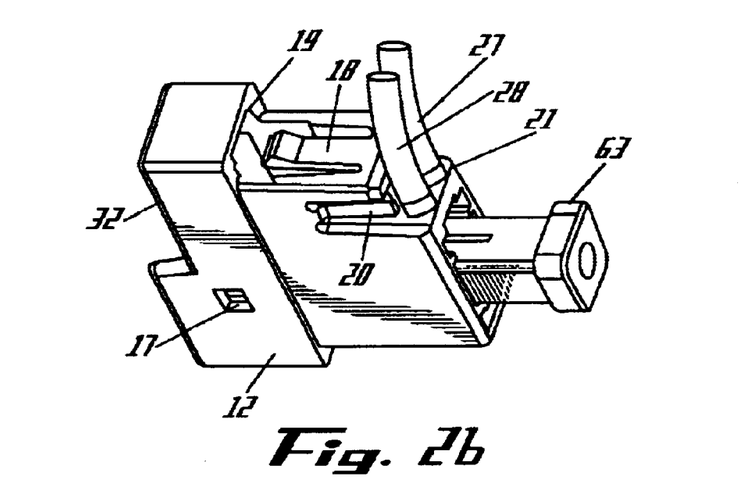

FIGS. 2a and 2b are front and rear views respectively of base member 12 with the switch assembly 21 mounted thereon and with a connecting plug 63 inserted in the opening in rear end 22. Plug 63 may be, as discussed in the foregoing, an SC type connector plug or any of other types of standard plugs. In a panel arrangement it is common practice to have all of the plugs 63 inserted in the bases 12 to be of the same type. Switch assembly 21 is held in place by anchoring arms 20, but it is to be understood that any suitable mounting for switch assembly 21 may be used with the switch actuator or plunger 24 facing toward the interior of housing 29. As discussed before, switch 23 is shown as a plunger type switch, however, any of a number of switch types may be used, such as, for example, a leaf switch or a Hall effect switch.

Figure 3A:
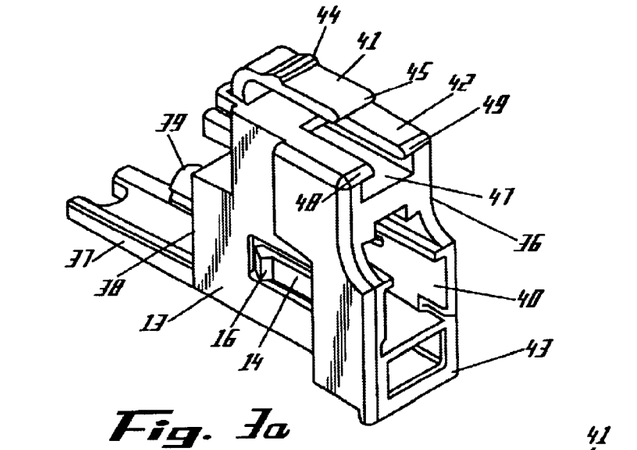
FIG. 3a is a rear isometric view of the cap member of the adapter.
Figure 3B:
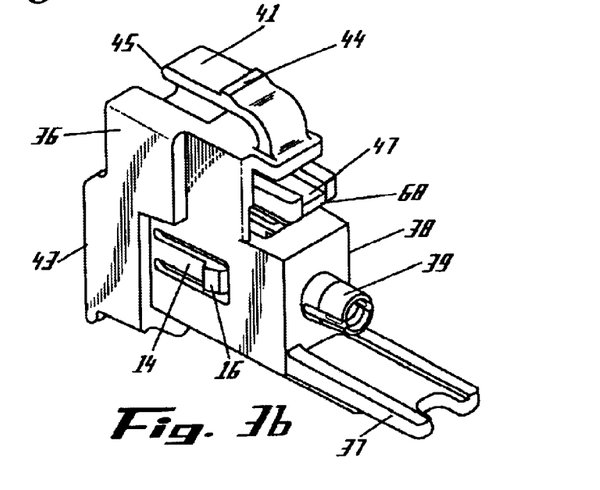

FIGS. 3a and 3b are rear and front views, respectively, of the cap 13 of the invention, as discussed with regard to FIG. 1. Opening 40 in the rear end 43 of cap body 36 receives a connector plug which, when inserted latches in the body 36 is a manner known and used in the prior art depending upon the type of connector plug used. As will be apparent hereinafter, the ferrule of the connector plug fits into alignment sleeve 39, as does the ferrule of connector 63 so that the ferrules are aligned and abut each other unless they are intentionally separated by, for example, an impedance or other device, such as a disk. The front end of slot 47 forms a latching shoulder 68, the purpose of which is explained hereinafter.

Figure 3C:
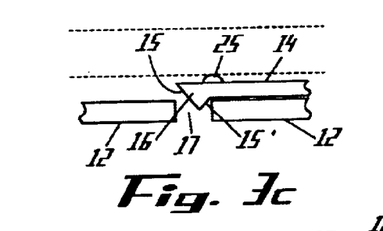
FIGS. 3c–3e are detail views of the latching arrangement for joining the cap member to the base member.
Figure 3D:
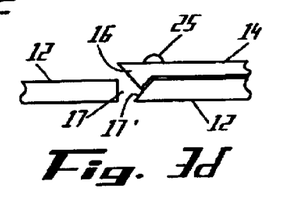
Figure 3E:
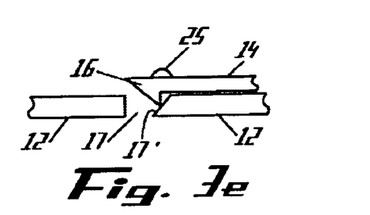

FIGS. 3c through 3d are partial detail views of the operation of the latching arm 14, enlarged portion 16 at the distal end of arm 14, and different configurations for latching port 17. In FIG. 3c it can be seen that enlarged portion 16 has a triangular shape, having a sloped front face 15 and a sloped rear face 15'. When the enlarged portion 16 is within port 17, cap member 13 is lightly latched to base 12, but, as pointed out hereinbefore, it can be easily removed with a one-half to one pound pull because of the slope of face 15' and the resilience of arm 14. However, when a connector plug 77 (see FIG. 7) shown in dashed lines in FIG. 3c, is inserted into cap 13, it bears against the inner surface of arm 14 and thereby prevents the portion 16 from being disconnected from port 17, thereby latching cap 13 firmly to base 12. The inner surface of arm 14 may have a raised portion 25 to ensure that the plug forces portion 16 into port 17 and prevents its removal. In FIG. 3d, port 17 is shown with an angled wall 17' engaged by said portion 16 to facilitate removal of cap 13 from base 12, and FIG. 3e shows enlarged portion 16 without rear face 15', but port 17 with the angled wall 17'. In all three cases, the angular relationship of the engagement of the enlarged portion 16 and port 17 maintains cap 13 and base 12 lightly latched together to prevent accidental separation, and yet facilitates separation when desired by a one-half to one pound pull on cap 13. However, when a connector plug is inserted into cap 13, the angular relationship is defeated and base 12 and cap 13 are firmly latched together.

Figure 4A:
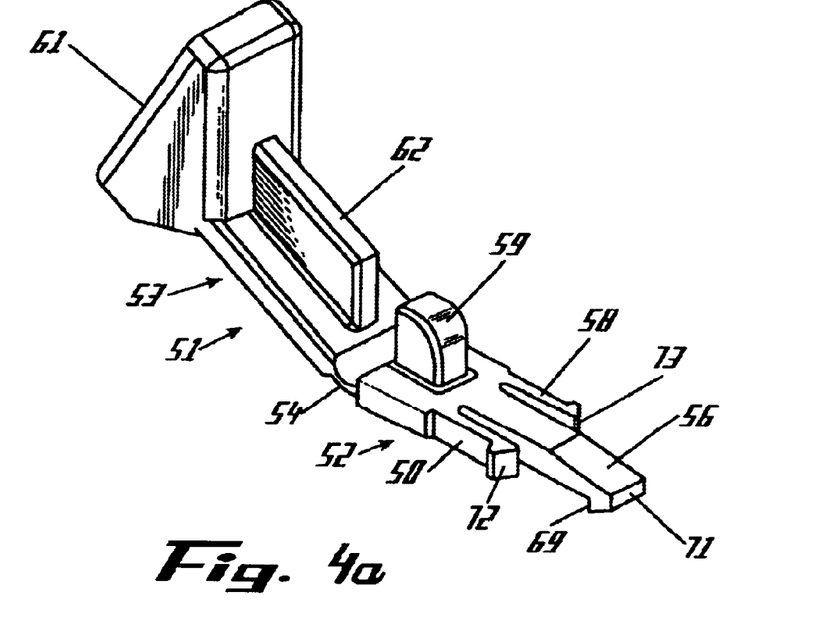
FIG. 4a is a front isometric view of the actuation lever of the adapter.
Figure 4B:
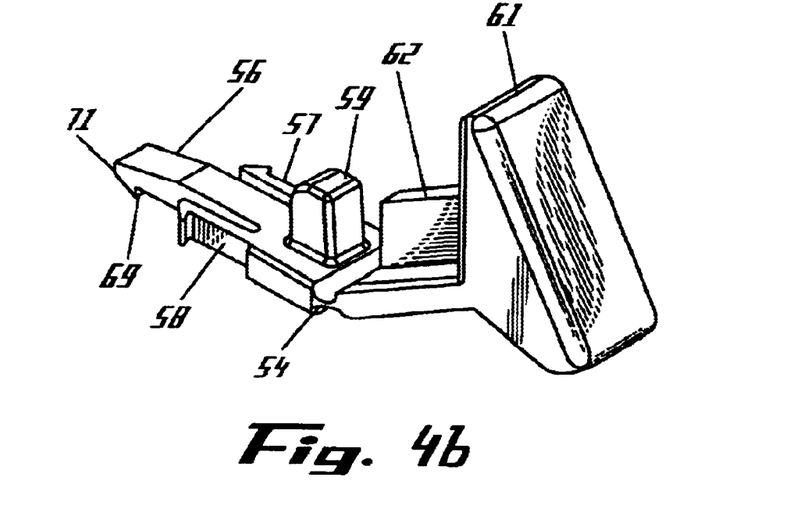
Figure 5:
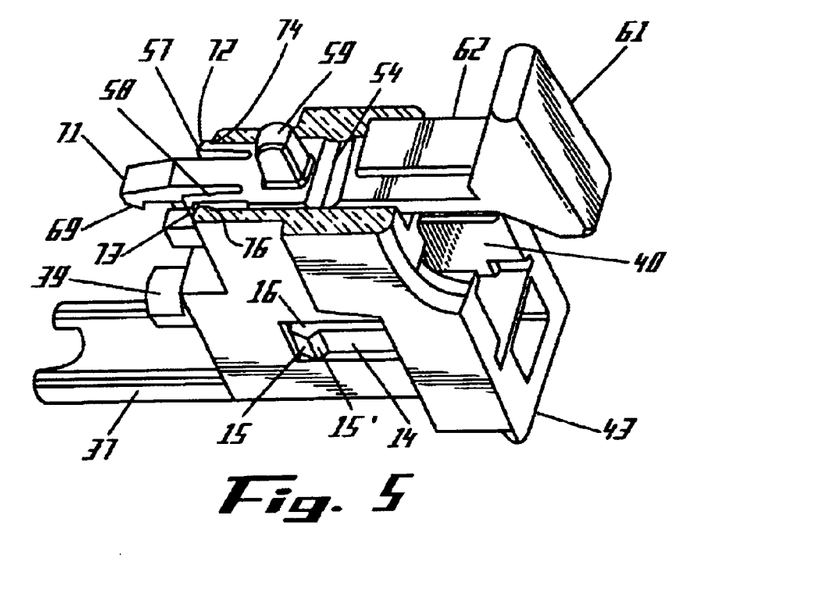
FIG. 5 is a side isometric view of the cap member of the adapter of the invention in partial cross section.

FIGS. 4a and 4b are, respectively, front and rear isometric views of the actuation lever 51. As can be seen, lever 51 comprises front portion 52 and rear portion 53 separated and joined by a flexible web 54. Front portion 52 comprises an elongated latching arm 56 having a latch projection 69 which is adapted to mate with latching shoulder 68 when lever 51 is located in slot 47 in its rearward position. The latching action between shoulder 68 and projection 69 prevents lever 51 from slipping out of slot 47, yet can be overcome upon the application of sufficient pulling force (1–2 pounds) for removal of the lever. The nose end 71 of arm 56 is the switch actuating end which, as will be apparent hereinafter, actuates the switch 23 by depressing plunger 24 when the lever is advanced to its forward position, which is shown in FIG. 5. In order that lever 51 be held in the forward or actuating position, front portion 52 thereof has first and second resilient latching arms 57 and 58 having, respectively, latch projections 72 and 73 which mate with latch projections 74 and 76 on either side of the slot 47, as seen in FIG. 5. When lever 51 is pushed forward, arms 57 and 58 are cammed inward as projections 72 and 73 pass over projections 74 and 76 and then snap outward as projections 72 and 73 latch to projections 74 and 76. As is the case with latch 68 and 69, the latching action is sufficient to prevent lever 51 from being pulled out of its forward position, but can be defeated by a one to two pound pull to the rear on lever 51 when removal thereof is desired. In the forward position as seen in FIG. 5, web 54 is well within slot 47, and, as a consequence, rear portion 53 cannot be bent upward, as shown in FIGS. 4a and 4b, being prevented therefrom by overhangs 48 and 49.

Figure 6:
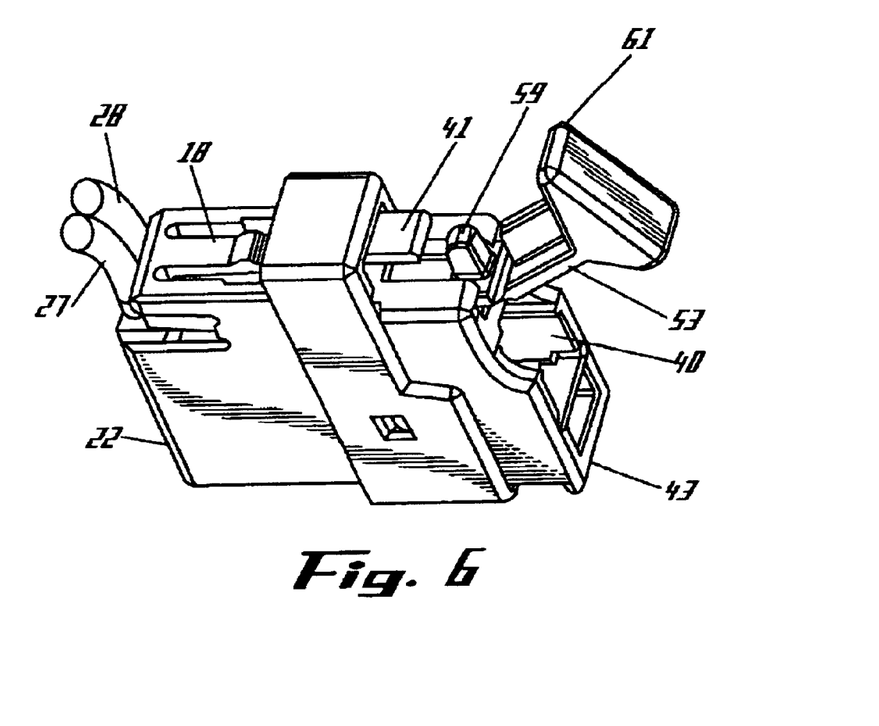
FIG. 6 is an isometric view of the adapter of the invention in its passive, or Power Off, configuration.
Figure 7:
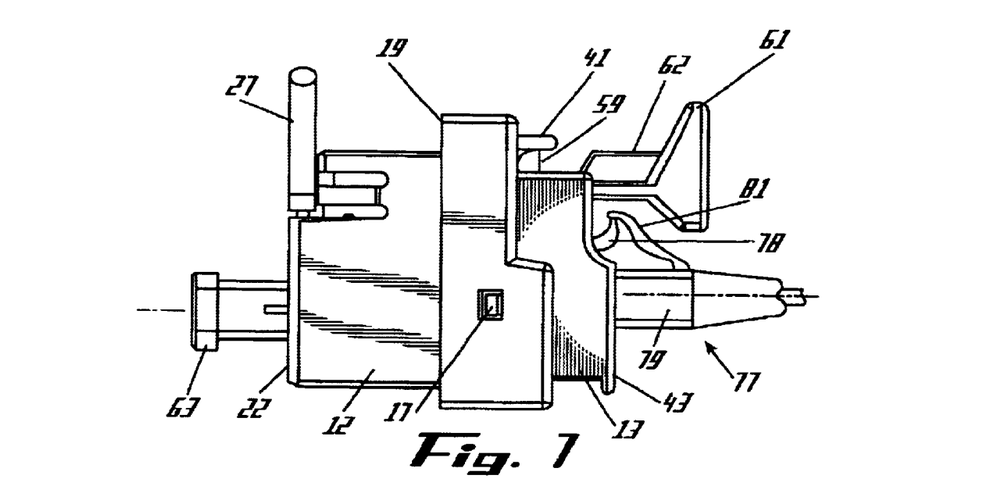
FIG. 7 is a side elevation view of the adapter of the invention in its active, or Power On, configuration.

The assembled adapter 11 in its non-actuating configuration, with a connector plug therein, is shown in FIG. 6, and FIG. 7 depicts the adapter 11 in its operating (actuated) configuration with a connector plug 77 inserted therein. For illustrative purposes, an LC connector plug is shown, however, as pointed out hereinbefore, plug 77 may be any one of a number of different plug types well known in the art. In FIG. 6, actuation lever 51 is in its rearmost position and although not shown, arm 56 thereon is latched to shoulder 68 at the end of slot 47. The rear portion 53 of lever 51 is shown bent upward so that enlarged portion 61 clears opening 40 for insertion of connector plug 77 therein. Latching arms 14 are latched to ports 17 and latching arm 41 is latched to shoulder 46, to the interior side thereof, in base member 12. Upon insertion of plug 77 into opening 40 to where its latching arm 78 is engaged in cap 13, in the manner well known in the art, the body 79 of plug 77 bears against the inner surfaces of latching arms 14 thereby preventing their disengagement from ports 17 and locking base 12 and cap 13 together, as discussed in connection with FIGS. 3c–3e.

After plug 77 has been inserted, rear portion 53 of lever 51 is bent down and pushed forward, as shown in FIG. 7, until latching arms 57 and 58 engage cap 13 as shown in FIG. 5. In this position, post 59 bears against the bottom surface of latching arm 41, thereby preventing its disengagement and further locking cap 13 to base 12. The under surface of enlarged portion 61 is shaped to allow room for the latch 78 and guard 81 of plug 77. However, as can be seen latch 78 and guard 81 are inaccessible to an operator so that plug 77 can not be unlatched and removed while actuation lever 51 is in the forward, or switch actuating position. Thus, the butting junction of the ferrules of plugs 63 and 77 cannot be broken or the ferrules otherwise disconnected while power passes through the connection. The only way that disconnection can occur is by the operator's pulling actuation lever to the rear with the necessary force to cause the latching action of latch projections 73 and 74 to be overcome and the latch effectively freed and portion 53 of lever 51 bent upward for access to arm 78 on plug 77. Such action, therefore, deactivates the switch 23 and the power is turned off before the operator can unlatch connector plug 77.

Figure 8:
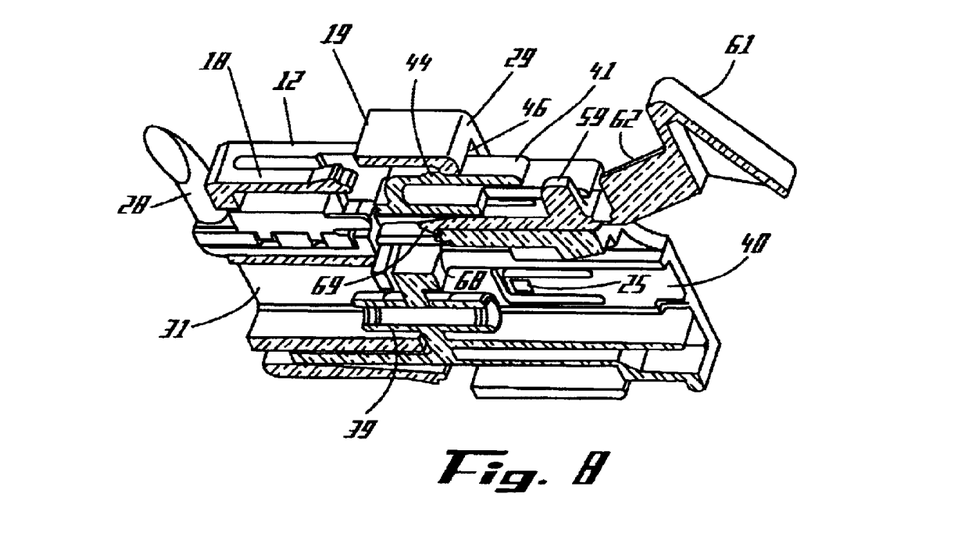
FIG. 8 is a cross sectional isometric view of the adapter of the invention in the configuration of FIG. 6.

FIG. 8 is a perspective view in cross section of the adapter assembly 11 in its passive or deactivated state, as shown in FIG. 6, with actuation lever 51 in its rear position. In this position, latching arm 41 of cap 13 is latched to shoulder 46 of base 12 and latch projection 69 of arm 56 of the actuation lever 51 is engaged with shoulder 68 at the end of slot 47 of the cap.

In those instances where it is desired that the adapter 11 have the smallest footprint possible, latching arm 41 may be eliminated. The cap 13 will still be latched to base 12 by means of latching arms 14 and projections 16 in ports 17. Under other circumstances, however, where footprint is not a pressing consideration, it is preferred that arm 41 be included as part of the cap.

From the foregoing it can be seen that a connector plug is insertable into the adapter when the power is off, and that the connector plug cannot be removed from the adapter when the power is on. It requires a positive action by the operator or installer to manipulate the actuation switch first, for inserting the connector plug with the power off, then turning the power on after the plug is in place.

The principles and features of the present invention in a preferred embodiment of the invention have been set forth in the foregoing. It is to be understood, however, that the various features of the present invention might be incorporated into other types of adapters and that other modifications or adaptations might occur to workers in the art. For example, the adapter may be, instead of split, a one piece adapter which contains the switch and the actuation lever. All such variations and modifications are intended to be included herein as being within the scope of the present invention as set forth. Further, in the claims hereafter, the corresponding structures, materials, acts and equivalents of all means or step-plus-function elements are intended to include any structure, materials, or acts for performing the functions in combination with other elements as specifically claimed.

What is claimed is:

1. An optical fiber coupling adapter assembly comprising:
   an adapter housing having first and second ends and having an open receptacle therein for receiving a connector plug at said first end;
   an actuation lever movably mounted in said adapter between said first and second ends having a first, Power Off, position when moved toward said first end and a second, Power On, position when moved toward said second end;
   a sensing mechanism at said second end responsive to said actuation lever in its Power On position for providing an indication of the Power On position of the lever;
   said lever, in its Power Off position, providing access to said receptacle for insertion of a connector plug into said first end of said adapter housing; and
   said lever, in its Power On position, blocking the connector plug for preventing its removal from said housing.

2. A coupling adapter assembly as claimed in claim 1, wherein said actuation lever is slidably mounted in said adapter for movement between said first and second positions.

3. A coupling adapter assembly as claimed in claim 1 wherein said actuation lever has a first latching member thereon for affixing said lever in said Power On position.

4. A coupling adapter assembly as claimed in claim 3 wherein said actuating lever has a second latching member thereon for preventing its accidental withdrawal from said adapter.

5. A coupling adapter assembly as claimed in claim 1 wherein said actuation lever comprises a front portion and a rear portion, joined by a flexible web.

6. A coupling adapter assembly as claimed in claim 5 wherein said actuation lever has a nose portion for actuating said sensing mechanism in the Power On position.

7. A coupling adapter assembly as claimed in claim 6 wherein said sensing mechanism is a switch having a plunger adapted to actuate said switch when moved by said nose portion.

8. A coupling adapter assembly as claimed in claim 5 wherein said rear portion of said actuation lever has an enlarged end adapted to mask the connector plug when said actuation lever is in the Power On position to prevent removal thereof.

9. A coupling adapter assembly as claimed in claim 1 wherein said adapter housing comprises a first, base, member and a second, cap, member insertable therein which, when joined together, form a split adapter, said cap member being adapted to receive a connector plug therein and having first and second resilient latching arms for latching said cap member to said base member.

10. A coupling adapter assembly as claimed in claim 9 wherein said resilient latching arms bear against a connector plug when it is inserted in said cap member to prevent said cap member from becoming unlatched from said base.

11. A coupling adapter assembly as claimed in claim 8 wherein said cap member has a top portion containing a longitudinal slot therein in which said actuation lever is slidably contained.

12. A coupling adapter assembly as claimed in claim 8 wherein said cap member has a top latching arm having a latching lug thereon for mating with a latching shoulder at a top portion of said base.

13. A coupling adapter assembly as claimed in claim 12 wherein said actuation lever has a post extending therefrom which bears against an underside of said top latching arm to prevent its unlatching when said actuation lever is in the Power On position.

14. A method of forming an active optical fiber connection with a buildout coupling adapter wherein the adapter comprises a base member and a cap member, the base member having a connector plug receptacle and a sensing mechanism and the cap member having a connector plug receptacle and an actuation lever slidably mounted thereon, the actuation lever having a Power Off and a Power On position, said cap member further having latching members for latching the cap member to the base member, comprising the steps of inserting the cap member into the base member until it latches thereto;

moving the actuation lever to its Power Off position;

bending the actuation lever to where it clears the connector plug receptacle in the cap member;

inserting a connector plug into the cap member receptacle; and sliding the actuation lever forward to its Power On position to actuate the sensing mechanism.

15. A method of disconnecting the buildout coupling adapter of claim 14 comprising the steps of sliding the actuation lever to its Power Off position;

bending the end of the actuation lever upward; and removing the connector plug from the cap member.

* * * * *